United States Patent

[11] 3,631,264

[72] Inventor: Martin J. Morgan, Rochester, N.Y.
[21] Appl. No.: 10,364
[22] Filed: Feb. 11, 1970
[45] Patented: Dec. 28, 1971
[73] Assignee: Sybron Corporation, Rochester, N.Y.

[54] INTRINSICALLY SAFE ELECTRICAL BARRIER SYSTEM AND IMPROVEMENTS THEREIN
36 Claims, 5 Drawing Figs.

[52] U.S. Cl. .................................................. 307/237, 307/202, 307/218, 307/304, 307/317, 307/318, 317/16, 328/169, 328/172
[51] Int. Cl. .................................................. H03k 5/08
[50] Field of Search ...................................... 307/93, 202, 241, 237, 218, 304, 317, 318; 328/169, 172; 317/16, 33 R, 33 SC

[56] References Cited

UNITED STATES PATENTS

| | | | |
|---|---|---|---|
| 3,146,358 | 8/1964 | Pratt | 317/33 SC X |
| 3,191,057 | 6/1965 | Feng | 307/218 |
| 3,262,018 | 7/1966 | Bogaerts et al. | 307/202 X |
| 3,317,792 | 5/1967 | Sutherland | 317/16 X |
| 3,475,653 | 10/1969 | Odenberg et al. | 317/33 SC |
| 3,527,985 | 9/1970 | Brown | 317/16 |

OTHER REFERENCES

Annular Report of H. M. Chief Inspector of Factories, Presented to Parliament by the Minister of Labour, Aug. 1967, pp. 79–81, London, England Primary Examiner—Stanley T. Krawczewicz
Attorney—Theodore B. Roessel ABSTRACT: A multiple barrier system for limiting transfer of electrical energy to intrinsically safe levels, including $n$ individual barriers each having a fuse and two resistors in series and a zener diode for limiting the voltage at the junction of the resistors. A high-voltage selector also connects each such voltage to a master barrier having a voltage limiting zener diode. The master barrier's zener diode is bypassed by a controlled rectifier which fires if the last said diode is over driven. In a modification, the one resistor of an individual barrier is replaced by a current limiting impedance consisting of self-biased transistors.

INTRINSICALLY SAFE ELECTRICAL BARRIER SYSTEM AND IMPROVEMENTS THEREIN

CROSS REFERENCES TO RELATED APPLICATIONS

B. L. Hallenbeck application for u.S. Pat. Ser. No. 829,491, filed June 2, 1969, and assigned to the assignee of the present application, describes barrier structure and principles, and intrinsic safety considerations, referred to herein.

BACKGROUND OF THE INVENTION

If, by reason of limiting the level at which electrical energy can be supplied electrical devices having elements which could produce hazardous effects, such as shocks, sparks and/or the like, unless said energy is so limited, systems having said devices generally can be considered intrinsically safe when said energy is so limited. In practice, intrinsic safety is ordinarily defined relative to specific situations wherein the effects are such as could cause ignition of inflammables and like destructive results, and reflects legislative and underwriters standards, and the like, as well as strictly technological considerations. The present invention relates particularly to intrinsic safety in the special sense but obviously relates also to intrinsic safety in a more general sense.

In any event, for the purposes of the present invention, an intrinsically safe electrical system has a safe part, a barrier, and a hazardous part, each of these parts including electrical elements.

The safe part is deemed safe because damage caused by fault or defect therein usually will be confined to the safe part. In general, only the safe part can be, or provide, actually or potentially, a source of electrical energy for the hazardous part.

The hazardous part is deemed hazardous because fault may cause damage to its environment if, as a result of the fault, electric energy in excess of a certain level obtains in the hazardous part. In general, the hazardous part must not be, or provide, actually or potentially, a source of excess electrical energy.

The barrier is considered a barrier because its function is to limit the level of electric energy transferrable from the safe part to the hazardous part. In general, the barrier also interconnects safe part and hazardous part for transfer therebetween of electrical energy at safe levels.

Geographically, the hazardous part may be as far as miles from the barrier part. Functionally, however, there is a safe *area* ending at the barrier and a hazardous *area* beginning at the barrier. Characteristically, the safe area contains such electrical energy sources as AC power lines and/or other entities which are either inherently sources of electrical energy, or can be made a function as such either accidentally, as by short circuiting or the like, or routinely, as by switching or the like. A barrier functions as an energy source so is in the safe area yet contacts the hazardous area.

As disclosed in the above-identified Hallenbeck application, barrier have been constructed such that probability of failure thereof is about $1\times10^{-18}$. Generally speaking, a barrier has "failed" if its condition becomes such that it would allow transfer of electrical energy, above a predetermined level defined as safe, to the hazardous area.

One of the most common situations is where the hazardous part is an electrical apparatus in which electrical sparking or heating could ignite inflammable vapors, gases, dust or the like, in the vicinity of the apparatus, i.e., in the hazardous area. The safe part, on the other hand, is apparatus including instrumentalities which are, or may provide, electrical energy sources, and which are connected in electrical circuit with the hazardous part. However, there is no significant ignition hazard in the vicinity of the safe part, i.e., in the safe area.

Other electrical safety considerations are prevention of shock to human beings working with electrical apparatus and prevention of damage to electrical apparatus as such. Barriers of the kind referred to herein can also serve such purposes as these.

Generally, there will be an overall system composed of a number of systems, so the overall barrier will be an array of individual barriers, corresponding in number to the total of non-ground electrical connections between the safe area and the hazardous area. Ground connection to the systems will be in the safe area, and commonly, a common ground bus mounts the barrier array, since each barrier, as will be seen, is connected to ground, and frequently also provides ground connection for the individual systems.

Constructionally, an individual barrier may be a monolithic structure having an input terminal at one end and an output terminal at an opposite end, and one or more ground terminals. The different terminals are well insulated from each other and are arranged insofar as possible such that improper connections cannot be made therebetween, short of conscious, deliberate action. Within the monolithic structure is circuitry for performing the barrier's electrical functions, and made insofar as possible unrepairable, as by encapsulation of the circuitry. In general, every effort is made to make the barrier itself as nearly as possible foolproof and faultproof.

The barrier of the Hallenbeck application consists of three 5 percent resistors, two 5 percent zener diodes, a fuse and hardware including a heat sink and mounting and connecting terminal structure, all encapsulated and cased. Failure of but one of the electrical components of a barrier is supposed to be repaired solely by discarding that barrier and replacing it with a sound one, a result which is practically perfectly assured by encapsulating the electrical components. Thus, the barrier's ultimate function is to blow its fuse, worth a few cents, so that its several dollars worth of resistors, diodes and hardware must be discarded. Using the barrier entails a considerable expense, and the more so where large numbers of barriers are used.

SUMMARY OF THE INVENTION

In the present invention, barrier cost is mitigated by replacing one barrier with two barriers, or, more generally, by replacing $n$ barriers with ($n+1$) barriers, wherein individual barrier structure is simplified to such extent that for relatively small values of $n$, the initial cost of the ($n+1$) barriers is less than the initial cost of the $n$ barriers, and at least $n$ of the ($n+1$) barriers are less costly to replace, in service, than the $n$ more complex barriers. This is achieved by sharing the ($n+1$)th barrier, hereinafter termed "master barrier" with the remainder of the ($n+1$) barriers, hereinafter termed individual barriers. In brief, the master barrier consists of essentially a single zener diode connected by an OR circuit to each of the individual barriers. Each individual barrier consists essentially of a fuse, two resistors, a zener diode, and part of the OR circuit (for example, an inexpensive switching diode). By virtue of the OR circuit, the zener diode of the master barrier provides the second zener diode of each individual barrier, which is to say, makes the individual barriers function like the two-zener-diode barrier disclosed in the above-identified Hallenbeck application.

The master barrier has, as thus far described, the effect of exposing one zener diode to perhaps ill-considered field repair, and moreover cannot be shared by all individual barriers simultaneously. This provides somewhat less intrinsic safety than provided by the two-zener-diode barrier, which it will be recalled, provides such degree of intrinsic safety as to have underwriter approval for all but the two most hazardous classes of atmospheres (e.g., acetylene and hydrogen).

According to the present invention, however, the master barrier can be provided with a protective controlled rectifier circuit which makes the present barrier system more safe than a system of Hallenbeck barriers.

Also, according to the present invention, the individual barriers can be modified so that a multiple barrier system is intrinsically safe, to the highest degree, for even the most hazardous class of atmospheres (e.g., acetylene). The modification consists of replacing one of the two individual barrier resistors with a current limiting resistance in the form of a pair of self-biased transistors.

Further, according to the invention, the zener diode of the master barrier is made substantially failureproof by providing it with current capacity far in excess of its needs. Moreover, the diode is also protected because the controlled rectifier circuit bypasses current around the diode, should the diode become overdriven.

DESCRIPTION OF THE PREFERRED EMBODIMENTS

Figure 1:
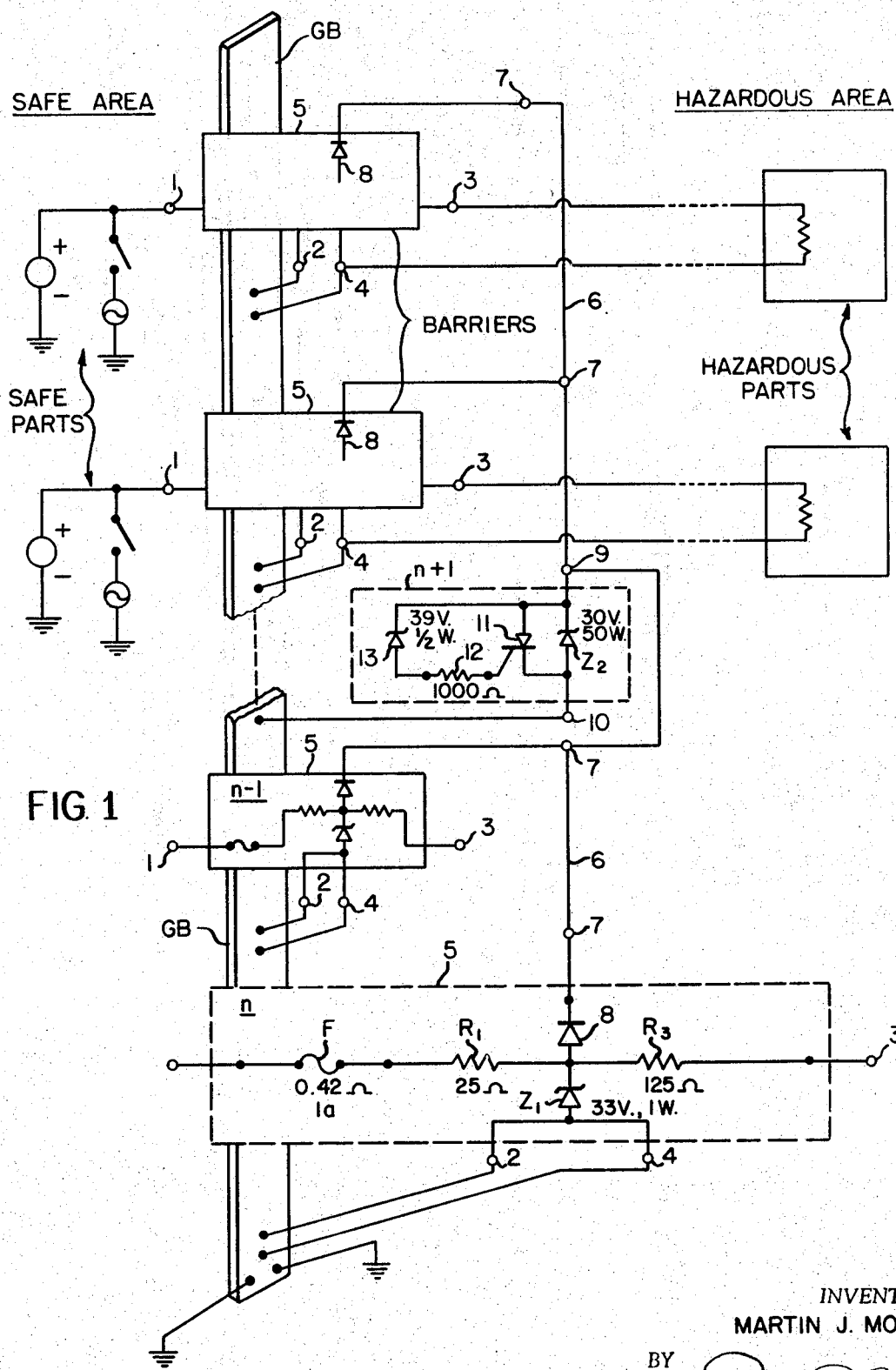
FIG. 1 is a schematic diagram of a multiple barrier array according to the invention.

In FIG. 1 are shown, figuratively, ($n+1$) barriers, including $n$ individual barriers and one master barrier designated ($n+1$). Of the individual $n$ barriers, only four are shown, and of these, circuit detail is depicted only in two of them.

The reference characters used in the showing of barrier $n$ are drawn, insofar as applicable, from FIG. 1 of the above-identified Hallenbeck application.

Unlike the Hallenbeck barrier, barrier $n$ lacks a zener diode $Z_2$ and a resistor $R_3$. However, the master barrier ($n+1$) has this zener diode $Z_2$, which is connected by a conductor 6 to an external terminal 7 of barrier $n$. Inside the casing 5, and encapsulated in epoxy or the like (not shown) with the rest of the barrier circuit, is a diode 8 interconnecting the terminal 7 to the cathode of diode $Z_1$. Since the anode of diode 8 is connected to the cathode of diode $Z_1$, positive voltage at the cathode of diode $Z_2$ will be impressed via the forward resistance of diode 7 on the cathode of diode $Z_2$. Comparing the zener voltages of diodes $Z_1$ and $Z_2$, the ratings of which are indicated in the Figure, it will be evident that the barriers $n$ and ($n+1$), together, will operate like the Hallenbeck barrier, namely, $Z_2$ will fire before $Z_1$. The absence of an $R_2$ resistor here is due to the fact that its basic function in the Hallenbeck barrier was to provide for nondestructively testing the barrier by impedance measurements at the terminals of the barrier. However, as $R_2$ also provided part of the predetermined series resistance of the barrier, $R_1$ and $R_3$, as indicated in the Figure, each have been increased in order to maintain substantially the same series resistance as the Hallenbeck barrier. In any event, removal of $Z_2$ to a master barrier obviates the testing function of $R_2$, and since two resistors cost less than three, $R_2$ has been eliminated.

The remainder of the individual barriers are identical to barrier $n$, as indicated by the ($n-1$)th barrier, designated ($n-1$), and shown as having the casing 5 and external terminals 1 through 4 and 7, with this last terminal connected to conductor 6. Again, the two undesignated barriers shown as the beginning of the array, at the top of ground bus or plate GB, have casings 5 and terminals 1 through 4 and 7, their terminals 7 being likewise connected to conductor 6. The circuitry within all the casings 5 is, of course, identical to that shown within the casings 5 of barriers $n$ and ($n-1$) but is not shown for the upper two barriers, except for the diodes 8.

Structurally, master barrier ($n+1$), like the individual barriers, will have its circuitry encapsulated and, as indicated by the dashed outline, will be suitably encased. However, it will have but two external terminals, a terminal 9, by which conductor 6 connects to the cathode of $Z_2$, and a terminal 10, by which the anode of $Z_2$ connects to ground bus GB, which may also provide mechanical support for barrier ($n+1$), and is preferably redundantly grounded, as shown at its lower end in FIG. 1.

The diodes 8 of the individual barriers provide OR circuitry which functions as a highest-of selector. That is to say, the voltage at the cathode of $Z_2$ will be the highest one of the anode voltages of the diodes 8. Further, this highest voltage causes the other diodes to be reverse biased, whereby the corresponding barriers are cut off from the terminal 9. In other words, if, say, barrier $n$ has the highest voltage at the anode of its diode 8, and this voltage is high enough to fire $Z_2$, the anode voltages of any of the other diodes 8 may take on any value, even one as high as required to fire diode $Z_2$, but will not be able to do so as long as barrier $n$'s diode 8 has the highest anode voltage. Consequently, while the degree of intrinsic safety provided the apparatus (not shown) connected to terminals 3 and 4 of barrier $n$ will be more than the Hallenbeck barrier would provide, the corresponding apparatus connected to the 3, 4 terminals of the barrier ($n-1$) might appear to be intrinsically safe to a lesser (albeit still very high) degree, because barrier $n$ is in control of the diode $Z_2$ of the master barrier ($n+1$). However, the probability of both barriers $n$ and ($n-1$) having to act simultaneously is small enough to be disregarded.

Further, the barrier system of FIG. 1 has a great cost advantage over an array of $n$ Hallenbeck barriers. Thus, as noted before, repair of a barrier consists of discarding it and replacing it with a new one. Usually, a barrier is discarded because it blows its fuse, one of the cheapest of its components, which means, in the case of the Hallenbeck barrier, discarding three perfectly good precision resistors and a selected pair of perfectly good zener diodes. With the present individual barrier, however, only one zener diode and two precision resistances are discarded, along with an inexpensive switching-type diode 8, the cost of which is much less than the total cost of one selected zener diode and one precision resistor.

While the master barrier $n$, as described thus far, adds at least some extra casing and terminal structure and restores one diode $Z_2$, the cost of this is spread out over up to 50 individual barriers. However, the zener diode $Z_2$ can be chosen so as to improve reliability in certain respects, and provide additional economies. Thus, as will be seen from FIG. 1, $Z_2$ is a 50-watt diode. While this is about 10 times as expensive as a lower rated zener diode which would function as well in its place, the likelihood, not only of $Z_2$ failure, but even $Z_1$ failure in an individual barrier, is decreased. In other words, probability of need of barrier replacement, due to causes other than fuse blowing, and of fuse blowing due to internal barrier faults, decreases.

Further, the larger rating of master barrier diode $Z_2$ allows a high rating for fuse F. Thus, as contrasted to the Hallenbeck barrier, which uses a ⅛ ampere, fast blow fuse, the individual barriers use 1 ampere, fast blow fuses. This cuts down fuse blowing due to such surges as the zener action of the barriers is able to suppress.

Finally, since fuse F can tolerate slow surges of relatively high current, $R_1$ is chosen to be a 2-watt wire wound resistor, so it acts like a slow blow fuse. Thus, a slow surge to 1 ampere, which does not activate the fast-blow characteristic of fuse F, will still open the winding of $R_1$, since 25 watts in $R_1$ quickly burns out its winding.

As shown, the circuit of master barrier $n$ includes an SCR (silicon controlled rectifier) 11, a 1,000 ohm resistor 12, and a 39 volt, ½-watt zener diode 13 having its anode connected to the gate of SCR by means of resistor 12. As the cathode of diode 13 is connected to the anode of SCR 11 and to the cathode of $Z_2$, and as the cathode of SCR 11 is connected to the anode of diode $Z_2$, it is evident that if the voltage at terminal 9 increases enough, the SCR 11 will fire and bypass current around diode $Z_2$.

This is intended to protect $Z_2$. Normally, SCR 11 will not come into play until after the voltage at terminal 1 of an individual barrier gets high enough to fire $Z_2$ initially, then $Z_1$ instead of $Z_2$, and then $Z_2$ again, yet without fuse F or resistor $R_1$ blowing out. At this point, both $Z_1$ and $Z_2$ are being overdriven, in terms of the current passing through them, so the voltages across them can rise well above their nominal firing voltages. This rise is a measure of the current through $Z_2$, and SCR 11 is intended to bypass $Z_2$ when the rise is such as to be due to zener current approaching a level that will damage $Z_2$. If the voltage at 9 gets to this point, diode 13 fires SCR 11. Since firing SCR 11 practically grounds the cathode of $Z_2$, via the very small anode/cathode resistance of the firing SCR, then $Z_2$ (and $Z_1$, also) is switched off. Once fired, the SCR 11 continues to fire until it is disconnected from the source of current therethrough. In practice, blowing fuse F or resistor $R_1$ disconnects the SCR 11. The SCR 11, of course, will have a much more generous capacity for carrying current than any other element in the barrier circuitry. The SCR, since its normal mode of operation is to fire, is substantially failure proof, as compared to the zener diodes, which normally do not fire, and when they do, only for the short time it takes to blow the fuse.

When constituted as described thus far, the barrier array of FIG. 1 is in general lesser in initial cost and lesser in upkeep cost than the corresponding array of Hallenbeck barriers. Thus, there are fewer components in the individual barriers that can be faulty, than in the Hallenbeck barrier. Obviously, the fewer components the less the likelihood of faults due to component failure. Further, as compared to its counterpart in the Hallenbeck barrier, zener diode $Z_2$ of barrier ($n$+1) is substantially perfectly proof against faulting. Finally, the individual barriers, because of the choice of fuse are less likely to blow the fuse unnecessarily than the Hallenbeck barrier with its lesser rated fuse and, of course, are much cheaper to replace.

As long as safe energy levels obtain, the barriers are merely DC connectors forming part of a transmission line interconnecting safe parts and hazardous parts of an intrinsically safe system. Such parts are illustrated briefly, for the top two barriers in FIG. 1, as sources of DC and AC, and as resistances terminating a usually more or less lengthy transmission line. The normal role of the transmission lines is to connect the DC sources to the corresponding load resistances. The AC sources, representing AC power lines, for example, simply represent some means of switching electrical energy (AC or DC) into the transmission lines, at unsafe levels, and ordinarily accidentally. The showing of switches here is, of course, intended not to represent necessarily switches as these are conventionally understood, but rather it represents the hazard of getting the AC connected to a transmission line, by whatever means there may be. The identity of the apparatus actually defining safe and hazardous parts is not material, since functionally it all reduces to electrical energy sources and loads on the energy sources.

Figure 2:
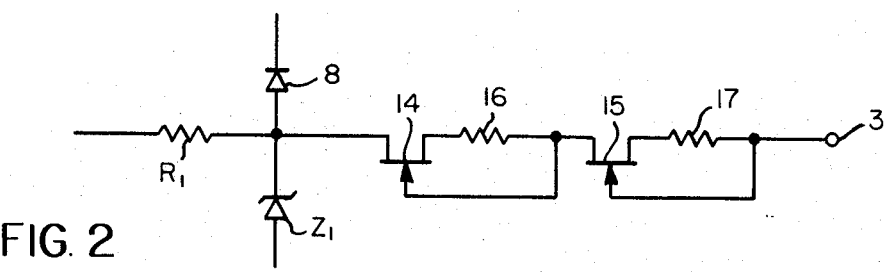
FIG. 2 is a schematic diagram of an individual barrier modified to have series resistance in field effect transistor (FET) form.
Figure 3:
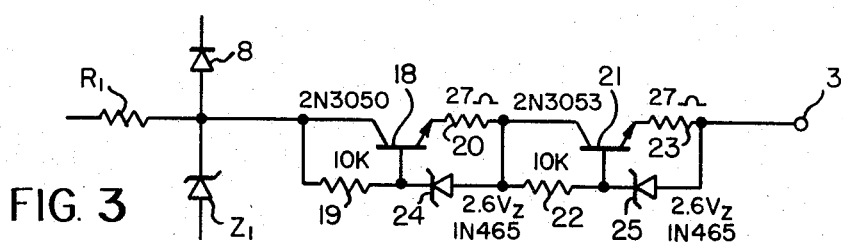
FIG. 3 is a schematic diagram of a bipolar transistor counterpart of the individual barrier shown in FIG. 2.

The degree of intrinsic safety provided by the barrier array of FIG. 1 can be increased by replacing resistors $R_3$ bodily with one or the other of the transistor configurations shown in FIGS. 2 and 3. Such modifications increase costs, of course, but in addition increase the degree of intrinsic safety far beyond that of the Hallenbeck barrier, which is rated safe for all atmospheres except those such as acetylene and hydrogen. The modifications of FIGS. 2 and 3, however, make the multiple barrier system provide the degree of intrinsic safety requisite for even acetylene, hydrogen and equivalent atmospheres.

In FIG. 1, the replacement for resistor $R_3$ consists of FET's (field effect transistors) 14 and 15. FET 14's source electrode is connected to the drain electrode of FET 15, via a resistor 16. FET 15's source electrode is connected to the terminal 3 via a resistor 17. The drain electrode of FET 14 is connected to the anode of diode 8, and to the cathode of diode $Z_1$.

The resistors 16 and 17 provide self-bias for the FET's, FET 14 having the voltage at the drain electrode of FET 15 connected to its gate electrode, and FET 15 having the voltage at terminal 3 connected to its gate electrode. Resistors 16 and 17 are so chosen that at the largest expectable normal value of drain to source current, the source to drain resistance of each FET will be not more than about half that of $R_3$, or, in any event, such that the sum of the source to drain resistances will be equal to the resistance of resistor $R_3$. At the same time, such value of drain to source current should bias the FET's just about to their pinched-off states. As a consequence, higher currents bias one or both of the FET's into pinching off. This in turn limits the current to a value larger than normal, but not excessively so, until or unless it gets large enough to cause a transistor to avalanche. However, initially, on of the FET's only will pinch off, while the other will remain unpinched off, or nearly so. If the pinched-off FET avalanches, the other transistor will limit the avalanched current, until it too avalanches. However, the chance of both transistors avalanching is substantially zero, even compared to the value of the probability of the barrier system failing to provide the desired degree of intrinsic safety.

The value of resistors 16 and 17 depends on the FET's specified current levels, etc. Thus, 2N3971 FET's have a maximum drain to source resistance of about 60 ohms each or less as long as they are operating below pinch-off, i.e., are operating in the so-called triode region. Further, this value of drain to source resistance is obtained at zero self-bias meaning that resistors 16 and 17 are zero-ohm resistors, which is to say that the gate and source electrodes of FET 14 would be directly connected to each other and to the drain of FET 15, while the latter's source and gate would be connected to each other directly and to terminal 3.

However, at some drain to source current in the range of (25–75) milliamperes, one of the 2N3971's would pinch-off, the consequences which would or can be as previously indicated.

FIG. 3 shows the bipolar transistor counterpart of FIG. 2. Here, FET 14 corresponds to NPN transistor 18 having base resistor 19 and emitter resistor 20, for self-bias. FET 15 corresponds to NPN transistor 21 having emitter resistor 23 and base resistor 22, for self-bias. Zener diodes 24 and 25, provide for connecting the transistor bases in a self-biasing configuration and, also, for permitting bidirectional current flow.

One suitable NPN transistor type for FIG. 3 is 2N3053. Other FET types for use in FIG. 2 are 2N4091 and 2N4977, these requiring resistors 16 and 17 of nonzero values. In general, a transistor type will do if the total of bias resistances and drain to source (or emitter to collector) resistances adds up to the value of the $R_3$ resistance to be replaced.

Obviously, one transistor could be used. However, the point of using two is to obtain redundancy for its safety value. For example, the most likely failure for an FET (or a bipolar transistor) is for it to develop a short circuit between drain and source (or collector and emitter) hence, each transistor provides, in effect, an automatic replacement for its fellow, should the latter fail short.

The component values indicated in FIGS. 2 and 3 are chosen in contemplation of eliminating the separate $R_2$ resistor of the Hallenbeck circuit. However, it is within the present invention to replace solely the $R_3$ resistor of the Hallenbeck circuit with either a single transistor, or a pair of transistors. In this circuit, as will be recalled, each barrier has its own zener diode $Z_2$ at all times, but a single-transistor version of $R_3$ would somewhat lower the degree of intrinsic safety provided by the two zener diodes and the fuse of the Hallenbeck circuit. The two transistor version of $R_3$, on the other hand, would substantially increase the degree of intrinsic safety of the Hallenbeck circuit.

Figure 4:
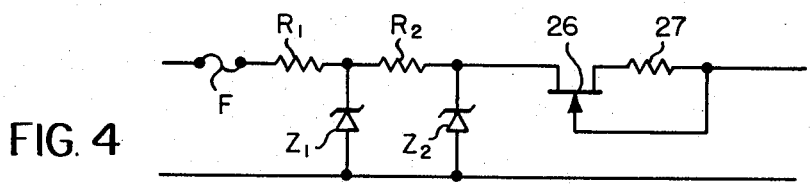
FIG. 4 is a schematic diagram of the Hallenbeck barrier modified to have series resistance in FET form.

FIG. 4 shows a single-transistor form of the Hallenbeck circuit. As will be seen, $R_3$ has been replaced by a single FET 26 having a self-bias resistance 27. Typical FET's would be 2N3971, 4091, 4392 and 4977, giving an $R_3$ range of about (15–60) ohms maximum for a self-bias resistance range of (0–45) ohms.

Figure 5:
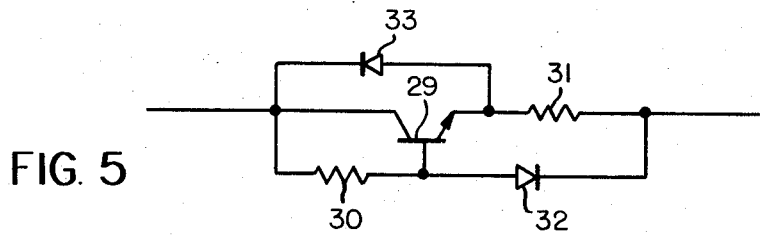
FIG. 5 shows a further example of transistor-type series resistance.

FIG. 5 shows a single bipolar transistor 29 replacing $R_3$, which could be used in FIGS. 2, 3 or 4. Here, self-bias is provided by resistors 30 and 31 and diode 32, with a diode 33 providing for flow of current in both directions. The parts values can be the same as in FIG. 3, except that the diodes are ordinary 1N458 diodes, rather than zeners.

Using transistors for resistance inherently adds a safety factor, due to the current sensitive regulating property, i.e., the current-limiting property. Ordinary resistances normally do not function this way significantly unless they have a very substantial positive temperature coefficient of resistance (and in any event respond to current change too slowly to be useful in barriers for current-limiting properties).

The fact that use of this safety factor presently requires redundancy, in order to make up for present day transistors' preference for failing short, as opposed to failing open, is not to be taken restrictively. It would be quite within the scope of the invention to use a fail-open type of transistor, if such be or become available, whereby to obviate the redundant transistor, yet obtain substantially the same benefit as with the redundant transistor.

The barriers illustrated are positive barriers. That is to say, they preform their functions for terminals 1 positive with respect to ground. (They would be short circuits for terminals 1 negative with respect to ground, which is therefore a fail-safe condition.) The negative counterparts exist. For example, reverse all the diodes of FIGS. 1, 2 and 3, replace the N-channel FET's of FIG. 2 with P-channel FET's, and replace the NPN-transistors of FIG. 2 with PNP's. The barrier array will then perform its functions for terminals 1 negative with respect to ground (and fail-safe by shorting the terminals 1 to ground if they turn positive).

The barrier system of FIG. 1 contemplates an $n$ of from about 10 to 50, though $n$ could be less than 10 or greater than 50. The larger $n$ is, the greater the economy, but also the larger the probability of more than one individual barrier at a time having a voltage at terminal 17 large enough to fire $Z_2$. It is to be observed that redundancy is greatly relied on to provide intrinsic safety. Thus, should $Z_2$ be fired by barrier $n$, this should lead to blowing barrier $n$'s fuse in a few milliseconds. At the same time, in the other barriers, $Z_1$ would be relied on to blow the corresponding fuse during those few milliseconds. Independently of all this, fuse F and $R_1$ offer fast-blow and slow-blow protection, and, of course, one barrier always has SCR 11 to short it in the last extremity.

The safe parts of the systems are of course connected to the 1, 2 terminals, whereas the hazardous parts of the system are, of course, connected to the 3, 4 terminals. The 2, 4 terminals will generally be ground terminals. While the depicted array suggests that the hazardous part of a system consists of devices each having a ground terminal and off-ground terminal, some devices can float off ground, or have more than one off-ground terminal, in which case there would be as many individual barriers for such a device as this last has off-ground or floating terminals, each such barrier having their 2, 4 terminals connected to circuit common which may or may not be "ground."

The specific parameters of the barrier circuitry derive from the voltage and current parameters of existing DC systems now in wide use. Specifically, the object is to limit the voltage across the 3, 4 terminals to about 30 volts when terminated by an effective load which can safely draw up to about 250 milliamperes, but normally draws much less, and which can tolerate the 150 ohms or so resistance of the barrier, as well as line resistance and the resistance seen looking out of the barrier through the 1, 2 terminals.

These particular parameters, system requirements, and circuit elements are not critical, and may vary. Thus, higher voltage systems exist, and these could utilize cold cathode gas tubes, mechanical switches, and the like, in place of zener diodes. In general, possible substitutes for zener diodes are any devices having a similar discharge characteristic, and suitable current carrying capacity and discharge voltage level, for instance tunnel diodes.

In the foregoing, I have described my invention in such detail as to enable one skilled in the art to make and use it. Such description, however, is to be taken as exemplary rather than as limiting.

I claim:

1. An intrinsic safety barrier combination, said combination including
  individual barriers for transmitting electrical energy applied thereto;
  an electrical energy selector connected to said individual barriers for selecting the one of said individual barriers transmitting the highest level electrical energy;
  and a master barrier connected to said selector for having said highest level electrical energy applied to said master barrier by said selector;
  said master barrier being responsive to said highest level electrical energy for preventing said one of said individual barriers from transmitting electrical energy above a predetermined level.

2. The intrinsic safety barrier combination of claim 1, wherein said individual barriers are responsive to voltage of said electrical energy applied thereto so as to limit energy transmitted thereby when said voltage exceeds a predetermined level;
  said selector being responsive to voltage for connecting said one of said individual barriers to said master barrier, and said master barrier being responsive to voltage to limit the amount of said electrical energy transmitted by said one of said individual barriers, when the voltage of the last said electrical energy exceeds a predetermined level.

3. The intrinsic safety barrier combination of claim 1, wherein said individual barriers form parts of closed loops carrying electrical currents transmitted by said individual barriers, and are responsive to voltage of said currents for diverting electrical current from the corresponding loops when said voltage exceeds a predetermined level;
  said master barrier also being responsive to voltage for diverting part of said current from one of said loops of which said one of said individual barriers forms a part, when the voltage of the last said current exceeds a predetermined level.

4. An intrinsic safety barrier combination, said combination including
  a first barrier, a second barrier, and a third barrier, each having an input and an output, and a high voltage selector having inputs and an output;
  said first barrier's said output being connected to one of said selector's said inputs, said second barrier's said output being connected to another of said selector's said inputs, and said third barrier's said input being connected to said selector's said output;
  said first barrier and said second barrier each having the property of conducting current between its input and its output, and the property of limiting voltage and current at its output;
  said high voltage selector having the property of providing, at its said output, current from that one of said first and second barriers having the highest of the voltages at the corresponding output;
  said third barrier having the property of conducting current between its said input and said output when and only when the voltage at its said input attains a given value.

5. The intrinsic safety barrier combination of claim 4, wherein at least one of said first and second barriers has current-sensitive resistance connected between its said input and output for conducting the corresponding said current, said resistance being sensitive to current for limiting said corresponding said current.

6. The intrinsic safety barrier combination of claim 5, wherein said resistance comprises interelectrode resistance of transistor means.

7. The intrinsic safety barrier combination of claim 5, wherein said resistance comprises interelectrode resistance of bipolar transistor means.

8. The intrinsic safety barrier combination of claim 5, wherein said resistance comprises interelectrode resistance of FET means.

9. The intrinsic safety barrier combination of claim 5, wherein said resistance comprises emitter-collector resistance of a self-biased bipolar transistor.

10. The intrinsic safety barrier combination of claim 5, wherein said resistance comprises source-drain resistance of a self-biased FET.

11. The intrinsic safety barrier combination of claim 5, wherein said resistance comprises interelectrode resistances in series of two bipolar transistors.

12. The intrinsic safety barrier combination of claim 5, wherein said resistance comprises interelectrode resistances in series of two FET's.

13. The intrinsic safety barrier combination of claim 4 in further combination with means connected to said outputs of said first and second barriers and providing loads for current from said first and second barriers, said loads and said output of said third barrier being connected to common terminal means; and also in combination with further means connected to said common terminal means and said inputs of said first and second barriers and providing electrical energy for producing said currents in said barriers.

14. An intrinsic safety barrier combination,
said combination including a first zener diode, a second zener diode and a third zener diode; a first resistance and a second resistance, said first resistance being connected to one electrode of said first zener diode, and said second resistance being connected to one electrode of said second zener diode;
a high voltage selector having a first input and a second input, and an output, for providing at its said output the higher of the voltages applied simultaneously at its said inputs, said first input being connected to said one electrode of said first zener diode, said second input being connected to said one electrode of said second zener diode, and said output being connected to one electrode of said third zener diode;
each said one electrode being like in polarity to its fellow said one electrode, and the zener voltage of said third zener diode being less than those of said first and second zener diodes.

15. The intrinsic safety barrier combination of claim 14, wherein said first resistance includes a first fuse means, and said second resistance includes second fuse means.

16. The intrinsic safety barrier combination of claim 14, and including a fourth zener diode and an SCR, said fourth zener diode having one electrode connected to said one electrode of said third zener diode, said SCR having one electrode connected to said one electrode of said third zener diode, said SCR having a second electrode connected to the other electrode of said fourth zener diode, and said SCR having its remaining electrode connected to the other electrode of said third zener diode;
said second electrode of said SCR being its gate, said one electrode of said fourth zener diode, and said remaining electrode of said SCR being like in polarity to said one electrode of said third zener diode, and the zener voltage of said fourth zener diode being larger than the zener voltages of said first and second zener diodes.

17. The intrinsic safety barrier combination of claim 16, wherein said first resistance includes first fuse means and said second resistance includes second fuse means.

18. The intrinsic safety barrier combination of claim 14, including a three-electrode transistor having a self-bias circuit for causing it to appear to be a current-sensitive resistance between two of its electrodes, said current-sensitive resistance being connected as a current-limiting resistance to said one electrode of said first zener diode for defining a third resistance.

19. The intrinsic safety barrier of claim 18, wherein said transistor is of the type wherein its said current-sensitive resistance conducts in one direction only, and there being diode means connected across the last said resistance for conducting current in the opposite direction.

20. The intrinsic safety barrier combination of claim 14, including a first three-electrode transistor and a second three-electrode transistor, each having a self-bias circuit for causing it to appear to be a current-sensitive resistance between two of its electrodes, such current-sensitive resistances being connected together to define a current-limiting series resistance, and said series resistance being connected to said one electrode of said first zener diode for defining a third resistance.

21. The intrinsic safety barrier of claim 20, wherein at least one of said transistors is of the bipolar type, whereby its said current-sensitive resistance conducts in one direction only, and there being diode means connected across the last said resistance for conducting current in the opposite direction.

22. The intrinsic safety barrier combination of claim 14, including an FET having its gate and source interconnected for self-bias for having its drain to source resistance determined by the current therethrough and by said self-bias, said drain to source resistance being connected to said one electrode of said first zener diode for defining a third resistance.

23. The intrinsic safety barrier combination of claim 14, including a first FET and a second FET, the one having its source electrode connected to the drain electrode of the other, and one of the remaining drain and source electrodes being connected to said one electrode of said first zener diode for defining a third resistance as the drain to source resistances of said FET's, in series; said gate and source of first FET being interconnected by first self-bias means for having its drain to source resistance determined by the current therethrough and by said first self-bias means; and said gate and source of said second FET being interconnected by second self-bias means for having its drain to source resistance determined by the current therethrough and by said second self-bias means.

24. The intrinsic safety barrier combination of claim 14, wherein said first resistance and said first zener diode are incorporated in a monolithic structure wherein the noninterconnected end only of said first resistance and the other electrode only of said first zener diode are accessible externally of said structure, wherein said second resistance and said second zener diode are incorporated in a monolithic structure wherein the noninterconnected end only of said second resistance and the other electrode only of said second zener diode are accessible externally of the last said structure, and wherein said third zener diode is incorporated in a structure separate from the former said structures.

25. The intrinsic safety barrier combination of claim 24, wherein said high selector consists essentially of one diode interconnecting the said one electrode of said first zener diode and said third zener diode, and another diode interconnecting said one electrode of said second zener diode and said third zener diode, said one and another diodes being polarized so as to form an OR circuit with respect to the voltages at each said one electrode of said first and second zener diodes; said one diode being incorporated within said monolithic structure with said first zener diode, and said another diode being incorporated within said monolithic structure with said second zener diode.

26. The intrinsic safety barrier combination of claim 24, wherein the first said monolithic structure incorporates a third resistance and the second said monolithic structure incorporates a fourth resistance, one end of said third resistance being connected to said one electrode of said first zener diode, and one end of said fourth resistance being connected to said one electrode of said second zener diodes, the other ends only of said third and fourth resistances being accessible externally of said first and second said monolithic structures.

27. An intrinsic safety barrier comprising, in combination first and second terminals and terminal means, first and second current limiting resistances, and normally nonconductive shunt impedance,
said first resistance having one end connected to said first terminal, said second resistance having one end connected to said second terminal, and said impedance having one end connected to said terminal means;
the other ends of said resistances and said impedance being connected, each to the other, said first resistance being responsive to current of given value to blow out like a fuse;

said second resistance being responsive to current of another given value to limit same to said another given value; said impedance being responsive to voltage at its said other end and corresponding to the first said current of the first said given value to become conductive between its said ends.

28. The intrinsic safety barrier of claim 27, wherein said first resistance is two further resistances interconnected in series, and said barrier also including a second normally nonconductive impedance like the first said impedance, said second impedance having one end connected to said terminal means and its other end connected to the interconnection of said further resistances.

29. The intrinsic safety barrier of claim 27, wherein said second resistance includes a self-biased transistor having three electrodes, such self-bias being that interelectrode resistance of said transistor functions as at least part of said second resistance.

30. The intrinsic safety barrier of claim 29, wherein said transistor is an FET, and said interelectrode resistance is the source to drain resistance thereof.

31. The intrinsic safety barrier of claim 29, wherein said transistor is bipolar, and said interelectrode resistance is the emitter-to-collector resistance thereof.

32. The intrinsic safety barrier of claim 29, wherein said second resistance also includes a second self-biased transistor like the first said transistor, the interelectrode resistances of said transistors being connected in series.

33. The intrinsic safety barrier of claim 32, wherein each said transistor is an FET, and said interelectrode resistances are the source to drain resistances of said FET's.

34. The intrinsic safety barrier of claim 32, wherein each said transistor is bipolar, and said interelectrode resistances are the emitter to collector resistances of said transistors.

35. An intrinsic safety barrier combination, said combination including individual barriers for transmitting electrical energy applied thereto;

an electrical energy selector connected to said individual barriers for selecting the one of said individual barriers transmitting the highest level electrical energy;

and a master barrier connected to said selector for having said highest level electrical energy applied to said master barrier by said selector;

each said barrier being responsive to level of electrical energy to transmit same only if last said level does not exceed a given value, and each said individual barriers being responsive, when selected by said selector, to said master barrier transmitting electrical energy, to cease transmitting electrical energy at a level above said given value.

36. The intrinsic safety barrier combination of claim 35 wherein each said individual barrier includes an element traversed by the electrical energy being transmitted by the last said individual barrier, said element being responsive to electrical energy at a level exceeding said given value to blow out like a fuse, and said last said barrier being responsive, when selected by said selector, to cause the level of electrical energy traversing said elements to increase beyond said given value.

* * * * *